United States Patent [19]

Massey, Jr.

[11] Patent Number: 4,643,440
[45] Date of Patent: Feb. 17, 1987

[54] PACKING WITH COMPENSATING MEANS
[75] Inventor: Arie F. Massey, Jr., Lenoir City, Tenn.
[73] Assignee: Massey Products, Inc., Knoxville, Tenn.
[21] Appl. No.: 825,339
[22] Filed: Feb. 3, 1986
[51] Int. Cl.⁴ ............................................. F16J 15/18
[52] U.S. Cl. .................................... 277/117; 277/121; 277/125
[58] Field of Search .............. 277/115, 116.2, 117–125

[56] References Cited

U.S. PATENT DOCUMENTS

| | | |
|---|---|---|
| 416,058 | 11/1889 | Grob . |
| 869,374 | 10/1907 | Law . |
| 963,645 | 7/1910 | Pendleton . |
| 1,584,127 | 5/1926 | Norton . |
| 1,591,876 | 7/1926 | Neal . |
| 1,872,219 | 8/1932 | Baash et al. ...................... 277/117 X |
| 2,075,947 | 4/1937 | Kennedy ......................... 277/117 X |
| 3,097,855 | 7/1963 | Allen ................................... 277/188 |
| 3,098,660 | 7/1963 | Hausner ............................. 277/187 |
| 3,227,464 | 1/1966 | Makin ................................. 277/105 |
| 3,272,520 | 9/1966 | Woolfenden ....................... 277/165 |
| 3,337,223 | 8/1967 | Nusbaum ........................... 277/112 |
| 4,353,560 | 10/1982 | Tohill ............................. 277/125 X |
| 4,410,189 | 10/1983 | Myers et al. ........................ 277/117 |
| 4,560,109 | 12/1985 | Teruyuki et al. ............... 277/121 X |

FOREIGN PATENT DOCUMENTS 518193 2/1940 United Kingdom ................ 277/115

Primary Examiner—Robert S. Ward
Attorney, Agent, or Firm—Luedeka & Neely

[57] ABSTRACT

Packing for a stuffing box for sealing a movable shaft including a sealing ring which is used together with a non-sealing compensator ring. The sealing ring includes the annular shaft sealing lip extending from said ring body along the shaft for contacting and sealing the shaft and a stuffing box sealing lip for contacting and sealing the stuffing box. The compensating ring includes a tapered annular protrusion having wedge faces for contacting and urging the shaft sealing lip toward the shaft and contacting and urging the stuffing box sealing lip towards the stuffing box when an axially-directed force is applied to the packing. The compensator ring is adjustable in diametrical dimensions so that contact is maintained between the wedge faces and the sealing lips and an effective seal is provided even if wear occurs on the sealing ring adjacent to the movable shaft.

10 Claims, 7 Drawing Figures

PACKING WITH COMPENSATING MEANS

The present invention relates to packing for sealing a movable shaft and more particularly relates to packing which is capable of fully compensating for wear to provide an effective seal over a long working life.

As a replacement for conventional fibrous packing used in a stuffing box, V-ring packing has been used to seal various movable shafts such as valve stems, centrifugal pump shafts, and other rotating and reciprocating shafts. V-ring packing generally employs a stack of rings with a V-shaped cross-section which act to spread one another to form a seal to the shaft and the stuffing box when the packing is compressed. Typical V-ring packing, however, is unable to fully compensate for wear which necessarily occurs adjacent to the movable shaft. To fully adjust for wear over the life of the packing, it is necessary that sufficient pressure be placed on the packing to deform the heaviest cross-section of the V-rings. This requires either periodic adjustment of force on the packing such as by tightening a packing gland or the use of a strong spring which may create excessive friction between the packing and the shaft before wear occurs. Therefore, there is a need for packing which is better suited for applications such as remotely-operated control valves where both long wear without maintenance or adjustment and low friction between the packing and the shaft are desired.

It is an object of the present invention to provide an improved packing for sealing movable shafts which is capable of fully compensating for wear to provide an effective seal over a long working life.

Other objects and advantages will be recognized from the following description including claims and drawings in which:

Figure 1:
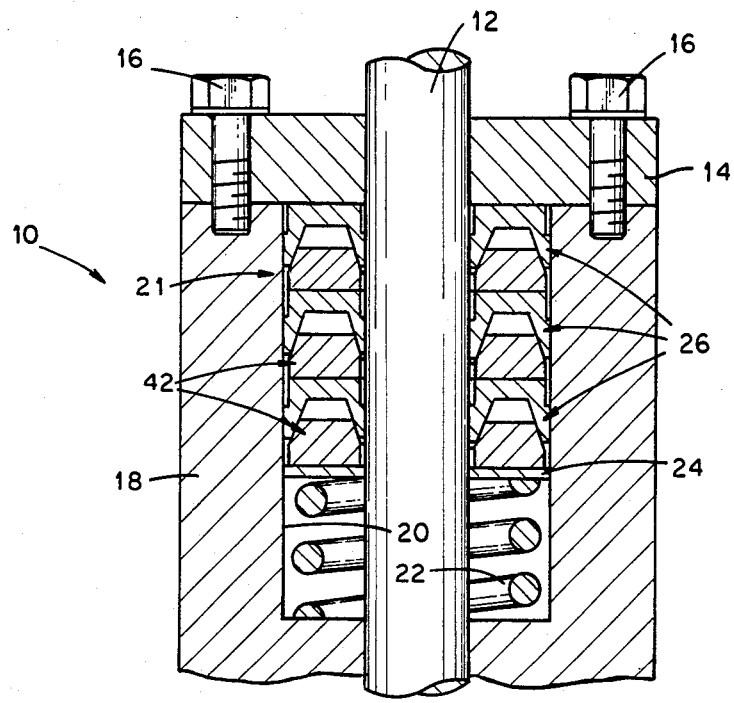
FIG. 1 is a somewhat diagrammatical cross-sectional view of a stuffing box for a valve stem showing one embodiment of the valve packing according to the present invention.

In accordance with the present invention, packing is provided for a stuffing box for sealing a movable shaft such as a valve stem, a cylindrical pump shaft, and other rotating and reciprocating shafts. Packing according to the present invention is made for use in a stuffing box defining a cylinder co-axial with the movable shaft and having means for exerting an axially-directed force on the packing.

Generally, packing according to the present invention includes a sealing ring capable of sealing to the movable shaft and the cylinder of the stuffing box. The sealing ring includes a sealing ring body and an annular shaft sealing lip extending from the ring body along the shaft for contacting and sealing the shaft. The shaft sealing lip has an an annular contact face inclined away from the shaft at an acute angle to the axis of the shaft. The sealing ring further includes an annular stuffing box sealing lip extending from the sealing ring body along the cylinder of the stuffing box for contacting and sealing to the cylinder which has an annular contact face inclined at an acute angle to the shaft axis away from the cylinder and stuffing box. Packing according to the present invention further includes a compensator ring having a compensator ring body and a tapered annular protrusion providing an inner wedge face opposing the inclined contact face of the shaft sealing lip and an outer wedge face opposing the inclined contact face of the stuffing box sealing lip. The compensator ring is adjusted in diametrical dimensions to establish and maintain contact between the inner wedge face and the inclined contact face of the shaft sealing lip and between the outer wedge face and the inclined contact face of the stuffing box sealing lip when the axially-directed force is applied to the packing. The compensator ring causes the inner wedge face to apply force to and urge the shaft sealing lip towards the shaft and causes the outer wedge face to apply force to and urge the stuffing box sealing lip towards the cylinder of the stuffing box.

In accordance with a preferred form of the present invention, the wedge faces of the compensator ring are operable to apply at least a substantially continuous line of force to the contact faces of the shaft and stuffing box sealing lips.

In accordance with another preferred form of the present invention, the compensator ring is a split ring with a stepped cut with sliding faces which lie in a plane generally perpendicular to the axis of the shaft and with the sliding faces intersecting the inner and outer wedge faces.

In accordance with another preferred form of the present invention with a compensation ring being a split ring with stepped cut with the sliding faces intersecting the inner and outer wedge faces, the inner and outer wedge faces have a break to a less acute angle as said annular protrusion tapers, the break in angle occurring at a circle in a plane generally perpendicular to the axis and spaced-apart from the sliding faces of the stepped cut in the direction that the protrusion tapers.

Packing according to the present invention is capable of compensating for wear occurring adjacent to the movable shaft and providing an effective seal without excessive force being applied to the packing.

Referring now to the drawings in which like reference characters designate like or corresponding parts throughout the several views, there is shown in FIG. 1 a stuffing box 10 for sealing a movable valve stem 12 as is used in a remotely operated control valve. The stuffing box 10 includes a packing gland 14 which is attached such as by bolts 16 to a stuffing box housing 18 which is attached to the valve body (not shown). The stuffing box housing 18 and packing gland 14 define an enclosed cylinder 20 which is co-axial with the valve stem 12 for confining packing 21 which seals the valve stem 12. In the stuffing box 10 depicted, a spring 22 and washer 24 are employed to apply a force aligned with the axis of the valve stem 12 to the packing. It will be understood that in other types of stuffing boxes that this axially-directed force may be applied to the packing 21 by, for example, an adjustable packing gland which may be tightened to increase the force applied.

Figure 5:
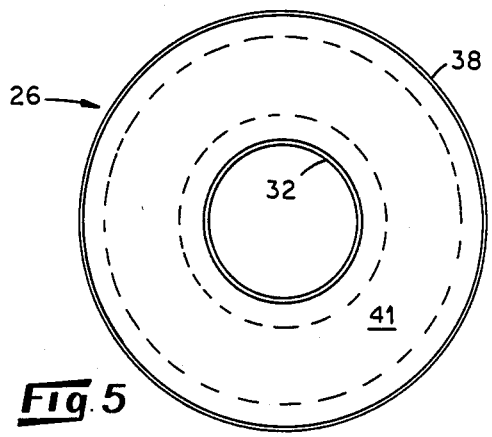
FIG. 5 is a plan view of an embodiment of a sealing ring for the packing illustrated in FIG. 1.
Figure 6:
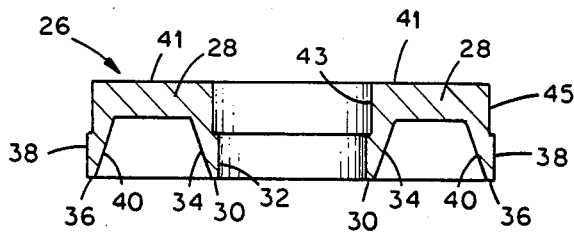
FIG. 6 is a cross-sectional view of the sealing ring of FIG. 5.

The drawings illustrate various forms of packing 21 according to the present invention. With reference to FIG. 1 and FIGS. 5 and 6, the packing 21 includes a sealing ring 26 for sealing the valve stem 12 by contacting the valve stem 12 and the cylinder 20. The sealing ring 26 includes a sealing ring body 28 which is preferably dimensioned to fit with slight clearance between the valve stem 12 and the cylinder 20 of the stuffing box 10. Extending from the sealing ring body 28 along the valve stem 12 for contacting and sealing to the valve stem 12 is an annular shaft sealing lip 30. The shaft sealing lip 30 preferably has a cylindrically-shaped shaft contact surface 32 for contacting and sealing the valve stem 12. The shaft sealing lip 30 also has an annular contact face 34 inclined away from the valve stem 12 at an acute angle to the axis of the valve stem 12. Preferably, the contact face 34 is frusto-conical in shape and defines an acute angle with respect to the valve stem 12 of between about 10° and about 25°, most preferably between about 18° and about 20°. Extending from the sealing ring body 28 along the cylinder 20 of the stuffing box 10 for contacting and sealing to the cylinder is a stuffing box sealing lip 36. The stuffing box sealing lip 36 has a stuffing box sealing surface 38 which is preferably cylindrical in shape which contacts and seals to the cylinder 20. The stuffing box sealing lip 36 further inclues an annular contact face 40 inclined at an acute angle to the valve stem axis away from the cylinder 20. The contact face 40 is preferably frusto-conical in shape and defines an acute angle with respect to the valve stem axis of between about 10° and about 25°, most preferably between about 18° and about 20°.

Figure 7:
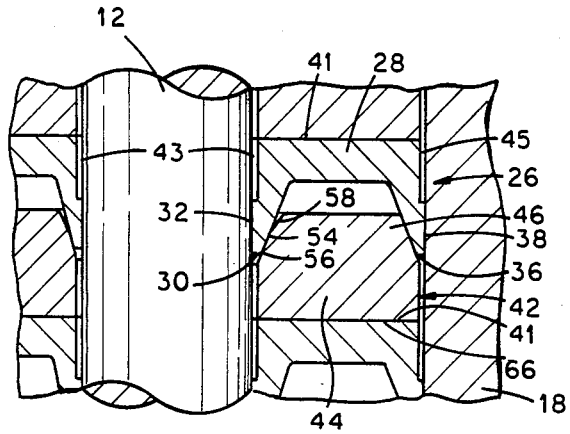
FIG. 7 is an enlarged cross-sectional view of another preferred form on the packing according to the present invention shown in a stuffing box for a valve stem.

For the preferred embodiment shown in FIGS. 6 and 7, the sealing ring 26 provides clearance between the sealing ring body 28 and both the valve stem 12 and the cylinder 20 while the sealing surfaces 32 and 38 on the sealing lips contact the valve stem 12 and the cylinder 20, respectively. As depicted, clearance is suitably provided between the sealing ring body 28 and the valve stem 12 by annular notch 43 and between the sealing ring body 28 and the cylinder 20 by annular notch 45.

The sealing ring 26 is made of a yieldable material which is capable of sealing to the valve stem 12 and the stuffing box 10. Preferably, the sealing ring 26 is made from a low friction polymeric material such as teflon or filled teflon which is also resistant to degradation and wear under service conditions of the particular application. As illustrated in FIGS. 1, 6 and 7, the sealing ring body 28 preferably has a generally planar force receiving surface 41 which is generally perpendicular to the axis of the valve stem 12.

As illustrated in FIGS. 1, 2, 3 and 4, the packing 21 according to the present invention includes a compensator ring 42 for contacting the shaft sealing lip 30 and the stuffing box sealing lip 36 of the sealing ring 26 and to urge them towards and into contact with the valve stem 12 and the cylinder 20, respectively. As shown in FIGS. 1 and 7 the compensator ring 42 includes a compensator ring body 44 which is preferably dimensioned so that there is clearance between the cylinder 20 and the ring body 44 and between the valve stem 12 and the ring body 44. Extending from the compensator ring body 44 is a tapered annular protrusion 46. The tapered annular protrusion 46 provides an inner wedge face 48 for opposing and contacting the inclined contact face 34 of the shaft sealing lip 30 and an outer wedge face 50 for opposing and contacting the inclined contact face 40 of the stuffing box sealing lip 36.

Figure 2:
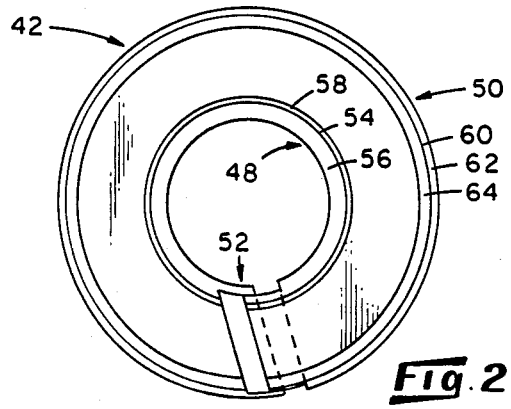
FIG. 2 is a plan view of a preferred form of a compensator ring for use in the packing illustrated in FIG. 1.
Figure 3:
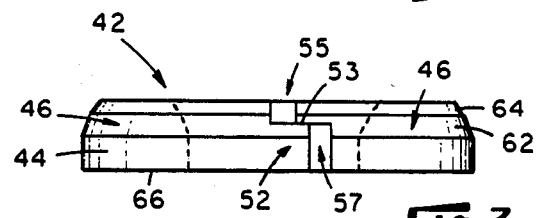
FIG. 3 is an elevational view of the compensator ring of FIG. 2.

The compensator ring 42 is adjustable in diametrical dimensions so that contact is maintained between the inner and outer wedge faces 48 and 50, respectively, and the inclined contact faces 34 and 40 of the shaft sealing lip 30 and the stuffing box sealing lip 36, respectively. As illustrated in FIGS. 2 and 3, this is preferably accomplished by employing a split ring most preferably with a stepped cut 52 which permits adjustment of the compensator ring 42 in diametrical dimensions. Preferably, the stepped cut 52 provides upper and lower sliding faces 53 which are perpendicular to the axis of the valve stem 12 and provide for sliding to adjust the diametrical dimensions of the compensator ring 42. The stepped cut 52 has upper and lower upright grooves 55 and 57, respectively, which are spaced-apart radially and which extend into the compensator ring 42 from the upper and lower sides, respectively. The grooves 55 and 57 provide clearance to allow for contraction of the diameter of the ring in use. A suitable method for constructing such a compensator 42 ring as shown is to form a continuous ring with the approximate diameter that is needed, forming grooves 55 and 57 which are generally parallel as shown in FIG. 2, and then forming the cut at sliding faces 53.

In FIG. 1 illustrating one preferred form of the packing according to the present invention, the inner wedge face 48 of the compensator ring 42 is frusto-conical in shape and the angle of the face 48 in relation to the valve stem axis is approximately the same as the angle of the inclined contact face 34 of the sealing ring 26 and thus has an angle in relation to the axis of the valve stem 12 of between about 10° and about 25°, and is and is preferably between about 18° and about 20°. Similarly, the outer wedge face 50 is preferably generally frusto-conical in shape and is provided with approximately the same angle as the inclined contact face 40 so that mating contact occurs between the outer wedge face 50 and the contact face 40. In the embodiment of FIG. 1, the angle of the outer wedge face 50 in relation to the axis of the valve stem 12 ranges between about 10° and about 25° to conform to the sealing ring 26 and most preferably is between about 18° and about 20°. As shown in FIG. 1 it is desirable for the angles of the inner wedge face 48 and the outer wedge face 50 to be approximately equal so that the force applied to the shaft sealing lip 30 is approximately equal to the force applied to the stuffing box sealing lip 36 as will become more apparent hereinafter.

Figure 4:
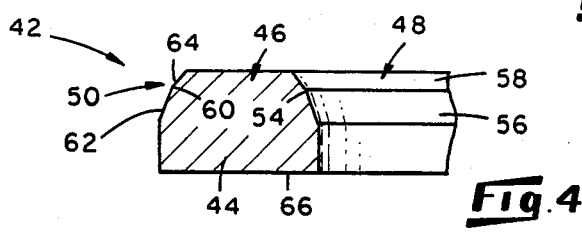
FIG. 4 is an enlarged, partial cross-sectional view of the compensator ring of FIG. 2.

As shown in FIG. 7 there is shown another embodiment of the valve packing according to the present invention showing an alternate form for the compensator ring 42. In this form of the invention, the inner wedge face 48 is provided with a break 54 in the angle of the face 48 which defines a first frusto-conical wedge surface 56 at a first acute andle in relation to the shaft axis and terminating at a circle at the break 54 lying in a plane generally perpendicular to the shaft axis. The break thus defines a second frusto-conical wedge surface 58 beginning at the break 54 which has a second acute angle which is less acute to the shaft axis than the first wedge surface 56. The break in angle preferably ranges between about 2° and about 5° for most applications. For some applications and as shown in FIGS. 2, 3 and 4, it is also desirable to have a break 60 in the angle in the outer wedge face 50 which provides a third frusto-conical wedge surface 62 and which terminates at a circle at the break 60 in a plane generally perpendicular to the shaft axis. A fourth frusto-conical wedge surface 64 also extends from the break 60 at a second acute angle which is less acute to the shaft axis than the angle between the third wedge surface 62 and the shaft axis.

In these forms of packing 21 having the compensator ring 42 having the breaks 54 or 60 in the angle of the wedge faces 48 and/or 50, it is preferable for the breaks to be spaced-apart from the sliding faces in the direction that the annular protrusion tapers, i.e., as depicted in FIGS. 3, 4 and 7, slightly above the sliding faces 53. For example, in a compensator ring 42 with ¼ inch section thickness, the break is preferably spaced-apart from the sliding faces 53 by a distance of between about 0.010 inch and 0.020 inches.

The compensator ring 42 is made of any material which is sufficiently rigid to provide force on the the sealing lips 30 and 36 of the sealing ring 26 and it is capable of expanding to allow enlargement of the ring's diametrical dimensions. The material must also be able to withstand service conditions for the particular application. The expander ring can be made, for example, of a polymeric material such as teflon or a filled teflon material similar to that used for the sealing ring 26. In the preferred form of the present invention illustrated, the expander ring 42 is provided with a generally planar surface 66 on the compensator ring body 24 which is remote from the annular protrusion 46 and which is generally perpendicular to the axis of the valve stem 12. The planar surface 66 facilitates adjustment of the compensator ring 42 in diametrical dimensions by enabling sliding on the planar surface 41 of the expander ring 26.

In use, packing according to the present invention is installed in a stuffing box with compensator rings 42 alternating with sealing rings 26. Because the compensator ring 42 is adjustable in diametrical dimensions, the inner wedge face 48 and the outer wedge face 50 are established in contact with the contact face on the shaft sealing lip 30 and the stuffing box sealing lip 36 when an axially-directed force is applied to the packing, the inner and outer wedge faces urge the shaft sealing lip 30 and the stuffing box sealing lip 36 into contact with the shaft and the stuffing box and a good seal is provided. When wear occurs on the inside of the packing adjacent the valve stem 12, the expander ring can contract in diametrical dimensions and a constant sealing force is thereby maintained on the shaft sealing lip 30 to engage the shaft sealing surface 32 with the valve stem 12.

If desired, the angle of the inclined contact face 34 on the shaft sealing lip 30 is equal to the angle of the contact face 40 of the stuffing box sealing lip 36. The forces acting to urge the shaft sealing lip 30 in contact with the valve stem 12 and the stuffing box sealing lip 36 in contact with the cylinder 20 of the stuffing box are thereby generally equalized. Because the compensator ring 42 is adjustable in diametrical dimensions these equalized forces will be generally maintained even when wear occurs on the shaft sealing surface 32.

Because the expander ring 42 includes stepped cut 52 in the wedge faces in the preferred embodiment, adjustment in diametrical dimensions is facilitated and at least a generally continuous line of force is applied by the inner wedge face 48 and the outer wedge face 50 to the sealing lips 30 and 36 when an axially-directed force is applied to the packing. In the embodiments of the invention providing a break in the angle above the sliding faces 53 in the inner, outer, or both wedge faces 48 and 50, the force on the surfaces below the break, e.g., wedge surface 56 and/or wedge surface 62, is concentrated since the area of contact between the wedge faces and the sealing lips is decreased. This concentration of force enables the essentially continuous circular line of force to provide a more effective seal.

Because of the planar surface 41 of the sealing ring body 28 and because of the the planar surface 66 on the compensator ring body 44 remote from the protrusion 46, the compensator ring 42 is free to slide on the sealing ring 26 and easily adjust in diametrical dimensions. For the preferred packing illustrated, the bottom of the stuffing box should be planar and perpendicular to the axis of the valve stem or appropriate adapters should be employed. Similarly, the surface of the gland for contacting the planer surface 41 of the sealing ring 26 should be planar and perpendicular to the axis of the valve stem or appropriate adapters should be used.

The packing according to the present invention provides an effective seal for a movable shaft such as a valve stem 12 and is suitable for various applications where a seal is needed for a reciprocating or rotating shaft. The packing according to the present invention is adjustable to compensate for wear on the inside of the packing adjacent to the movable shaft provided that a modest yet sufficient axially-directed pressure is present. Further, the packing of the present invention is particularly suitable for remotely-operated control valves where an axially directed force is applied to the packing with a spring. The packing of the present invention is suitable for applications calling for a single packing element where packing according to the present invention employs one compensator ring 42 and one sealing ring 26. For applications calling for a multiple packing elements, an alternating stack of sealing rings 26 and compensator rings 42 are employed.

While preferred embodiments of the present invention have been shown and described, it will be understood that there is no intent to limit the invention by such disclosure, but rather it is intended to cover all modifications and alternate constructions falling within the spirit and scope of the invention as defined in the appended claims.

What is claimed is:

1. Packing for a stuffing box for sealing a movable shaft, the stuffing box defining a cylinder coaxial with the movable shaft and having means for exerting an axially-directed force to said packing, said packing comprising:

a sealing ring of yieldable material capable of sealing to the movable shaft and the cylinder of the stuffing box, said sealing ring comprising a sealing ring body and an annular shaft sealing lip extending from said ring body along the shaft for contacting and sealing the shaft, said shaft sealing lip having an annular contact face inclined away from the shaft at an acute angle to the axis of the shaft, said sealing ring further comprising an annular stuffing box sealing lip extending from said ring body along the cylinder of the stuffing box for contacting and sealing to the cylinder, said stuffing box sealing lip having an annular contact face inclined at an acute angle to the shaft axis away from said cylinder of said stuffing box;

a compensator ring having a compensator ring body and a tapered annular protrusion providing an inner wedge face opposing said inclined contact face of said shaft sealing lip and an outer wedge face opposing said inclined contact face of said stuffing box sealing lip, said compensator ring being adjustable in diametrical dimensions to establish and maintain contact between said inner wedge face and said inclined contact face of said shaft sealing lip and between said outer wedge face and said inclined contact face of said stuffing box sealing lip when the axially directed force is applied to said packing to cause said inner wedge face to apply force to and urge said shaft sealing lip towards said shaft and to cause said outer wedge face to apply force to and urge said stuffing box sealing lip towards said cylinder of said stuffing box, said inner and outer wedge faces of said compensator ring being operable to apply at least a substantially continuous line of force to said contact faces of each of said shaft and stuffing box sealing lips.

2. The packing of claim 1 wherein said compensator ring body of said compensator ring has a generally planar surface remote from said protrusion which is generally perpendicular to the axis of the shaft and said sealing ring body of said sealing ring has a generally planar surface remote from said shaft sealing lip and said stuffing box sealing lip which is generally perpendicular to the axis of the shaft.

3. Packing for a stuffing box for sealing a movable shaft, the stuffing box defining a cylinder coaxial with the movable shaft and having means for exerting an axially-directed force to said packing, said packing comprising:

a sealing ring of yieldable material capable of sealing to the movable shaft and the cylinder of the stuffing box, said sealing ring comprising a sealing ring body and an annular shaft sealing lip extending from said ring body along the shaft for contacting and sealing the shaft, said shaft sealing lip having an annular contact face inclined away from the shaft at an acute angle to the axis of the shaft, said sealing ring further comprising an annular stuffing box sealing lip extending from said ring body along the cylinder of the stuffing box for contacting and sealing to the cylinder, said stuffing box sealing lip having an annular contact face inclined at an acute angle to the shaft axis away from said cylinder of said stuffing box;

a compensator ring having a compensator ring body and a tapered annular protrusion providing an inner wedge face opposing said inclined contact face of said shaft sealing lip and an outer wedge face opposing said inclined contact face of said stuffing box sealing lip, said compensator ring being adjustable in diametrical dimensions to establish and maintain contact between said inner wedge face and said inclined contact face of said shaft sealing lip and between said outer wedge face and said inclined contact face of said stuffing box sealing lip when the axially directed force is applied to said packing to cause said inner wedge face to apply force to and urge said shaft sealing lip towards said shaft and to cause said outer wedge face to apply force to and urge said stuffing box sealing lip towards said cylinder of said stuffing box, said compensator ring comprising a split ring having a stepped cut with sliding faces which lie in a plane generally perpendicular to the axis of the shaft, said stepped cut providing for adjustment of the diametrical dimensions of said compensator ring, said sliding faces of said stepped cut in said compensator ring intersecting the inner and outer wedge faces of said protrusion so that said inner and outer wedge faces of said compensator ring are operable to apply at least a substantially continuous line of force to said contact faces of each of said shaft and stuffing box sealing lips.

4. The packing of claim 3 wherein said inner wedge face and said inclined contact face of said shaft sealing lip are frusto-conical in shape and the angle between said inner wedge face and the shaft axis is approximately equal to the angle between said inclined contact face of said shaft sealing lip and the shaft axis.

5. The packing of claim 4 wherein said outer wedge face and said inclined contact face of the stuffing box sealing lip are frusto-conical in shape and the angle between said outer wedge face and the shaft axis is approximately equal to the angle between the inclined contact face of the stuffing box sealing lip and the shaft axis.

6. The packing of claim 5 wherein the angle between said inner wedge face and the shaft axis is approximately equal to angle between said outer wedge face and the shaft axis.

7. The packing of claim 3 wherein said inner wedge face comprises a first annular wedge surface being frusto-conical shape at a first acute angle in relation to the shaft axis, said first annular wedge surface extending past the sliding faces of the stepped cut in the direction said protrusion tapes and terminating at a circle lying in a plane generally perpendicular to the shaft axis and a second wedge surface having a frusto-conical shape beginning at said circle at a second acute angle which is less acute to the shaft axis then said first acute angle.

8. The packing of claim 7 wherein the outer wedge face has a third annular wedge surface which is frusto-conical in shape extending past the sliding faces of the stepped cut in the direction said protrusion tapers and terminating at a circle lying in a plane generally perpendicular to the shaft axis and a fourth wedge surface beginning at said circle which is frusto-conical in shape at a second acute angle which is less acute to the shaft axis then said first acute angle.

9. The apparatus of claim 7 wherein said first acute angle and said second acute angle differ by between about 2° and about 5°.

10. The apparatus of claim 9 wherein said first acute angle and said second acute angle of said inner wedge face and said first acute angle and said second acute angle of said outer wedge face differ by between about 2° and about 5°.

* * * * *